Sept. 30, 1969     J. M. CRAIG ET AL     3,469,805

METHOD FOR INFLATING A BALLOON

Filed Oct. 24, 1967

CLOSED POSITION

OPEN POSITION

INVENTORS.
JIMMIE M. CRAIG
RUSSELL A. POHL
PAUL E. YOST

BY

ROY MILLER
ATTORNEY.

United States Patent Office 3,469,805
Patented Sept. 30, 1969

3,469,805
METHOD FOR INFLATING A BALLOON
Jimmie M. Craig, China Lake, Calif., and Russell A. Pohl and Paul E. Yost, Sioux Falls, S.D., assignors, by direct and mesne assignments, to the United States of America as represented by the Secretary of the Navy
Filed Oct. 24, 1967, Ser. No. 677,795
Int. Cl. B64b 1/58
U.S. Cl. 244—31
1 Claim

ABSTRACT OF THE DISCLOSURE

A method and means for inflating a hot air balloon supporting a load aloft which comprises providing peripheral ports located along the equator of a balloon between the vertical seams of each gore and so shaped as to scoop air. When the balloon is launched ram air enters through the ports thereby inflating the balloon in a few seconds.

GOVERNMENT INTEREST

The invention herein described may be manufactured and used by or for the Government of the United States of America for governmental purposes without the payment of any royalties thereon or therefor.

BACKGROUND OF THE INVENTION

The present invention relates to a method and means for inflating a hot air balloon.

Launching a balloon carrying a payload has presented varied problems. Parachutes have been used to deliver people, support materials, munitions, flares, etc., and have often failed as a result of tearing or fouling of the parachute and sometimes disconnection thereof. Many efforts have been made to overcome these difficulties such as use of auxiliary drag parachutes to slow down the payload assembly prior to opening or suspension of the main chute. Inflation of a hot air balloon adapted to support a payload aloft in a matter of seconds presented even more difficulty. The present invention provides a method and means for facilitating rapid inflation of such a balloon and because of the low deployment shock will not require reefing of the balloon envelope at high delivery speeds.

SUMMARY

In accordance with the present invention peripheral ports are positioned along the equator of a balloon structure composed of a plurality of vertical gores seamed together at their vertical edges. Each gore consists of two segments which are overlapped forming scoop-like ports. When the balloon is launched ram air enters these ports thereby inflating it in only a matter of seconds. It is therefore an object of the present invention to provide a method for rapid inflation of a balloon efficiently at altitudes ranging from 500 to 15,000 feet.

DESCRIPTION OF THE INVENTION

Figure 3:
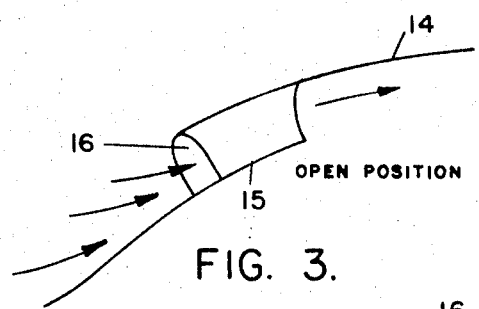
FIG. 3 is an enlarged fragmentary sectional view taken along lines 3—3 of FIG. 1.
Figure 1:
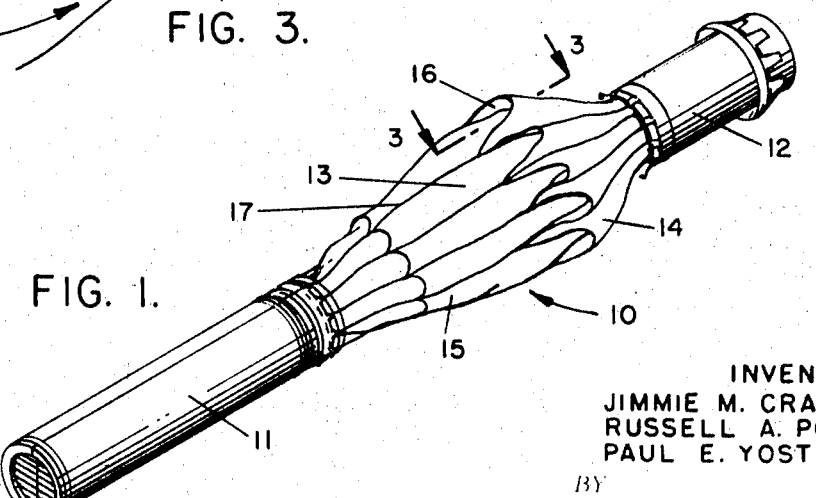
FIG. 1 is a side elevational view showing a balloon and its deployment case separation.

Referring now to the drawings FIG. 1 illustrates a balloon 10 carrying a payload 11 at deployment or launch and just prior to the release of balloon housing 12. Balloon 10 is formed in vertical gores generally designated by numeral 13 which are joined at their vertical edges by seams. Each gore consists of two segments or sections, an upper section 14 and a lower section 15. The lower section 15 is cut wider than upper section 14 which overlaps the lower section 15 as shown in FIG. 3 by several inches forming a peripheral port 16 about the equator of balloon 10 between the gore seams 17. Peripheral port 16 is shaped so that it will scoop air.

The balloon material is of a conventional type such as nylon. It must be lightweight, nonporous, flexible and act as a gas barrier.

Figure 2:
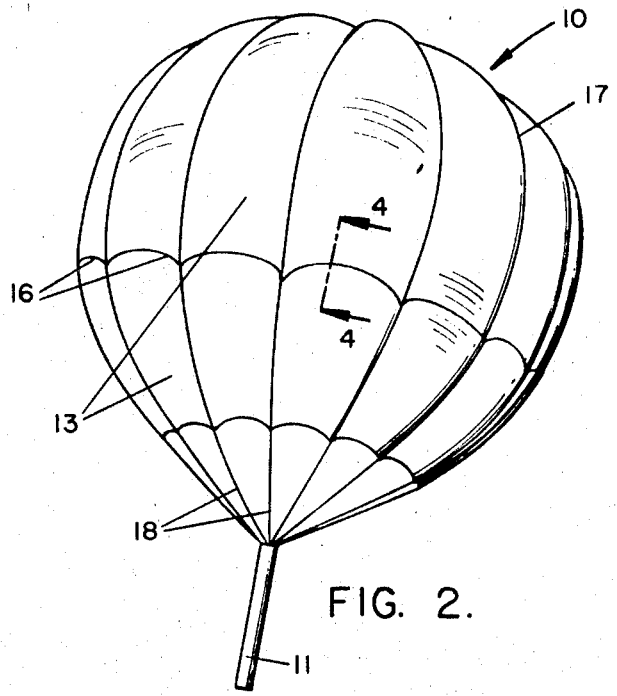
FIG. 2 is a perspective view showing a fully inflated balloon incorporating the present invention.

As shown in FIG. 2 payload 11 is supported beneath the balloon by load lines 18 suitably attached at the lower end of the balloon.

Figure 4:
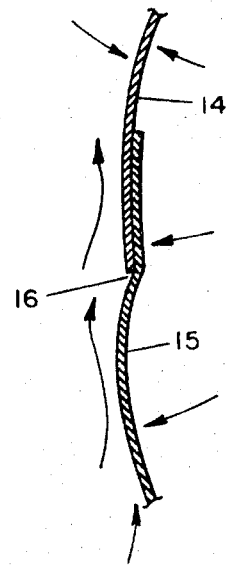
FIG. 4 is an enlarged fragmentary sectional view taken along line 4—4 of FIG. 2.

In operation when balloon 10 is launched at from 500 to 15,000 feet at a speed ranging from 100 to 600 miles per hour ram air enters the ports 16 fully inflating the balloon as shown in FIG. 2 in from 1 to 5 seconds. Ports 16 are closed as shown in FIG. 4 when the balloon is inflated and are held closed by the hydrostatic pressure from within the balloon envelope pressing against the overlapping segments which form each gore.

What is claimed is:
1. A hot air balloon structure adapted to support a load aloft comprising:
a balloon envelope formed of a plurality of vertical gores of nonporous, lightweight, flexible, gas barrier material joined together at their vertical edges by seams and shaped with a rounded upper end and a downward tapered lower end; said gores consisting of an upper segment and a lower segment, said lower segment being wider than said upper segment which overlaps said lower segment by several inches thereby forming a port positioned about the equator of said balloon between said seams; said upper segment being closed at its upper end to form the apex of said balloon; and said port being shaped so that it will scoop air when said balloon is launched at from 500 to 15,000 feet at a speed ranging from 100 to 600 miles per hour thereby inflating said balloon and closing said ports by hydrostatic pressure from within the balloon envelope pressing against the overlapping portions of said segments which form each of said gores.

References Cited

UNITED STATES PATENTS

| 1,562,258 | 11/1925 | Russell | 244—145 |
| 3,131,889 | 5/1964 | Yost | 244—31 |
| 3,168,266 | 2/1965 | Yost | 244—138 |
| 3,366,345 | 1/1968 | Pohl et al. | 244—31 X |

MILTON BUCHLER, Primary Examiner
JEFFREY L. FORMAN, Assistant Examiner

U.S. Cl. X.R.
244—145